(No Model.)

T. EDWARDS, Jr.
GARDEN SEED DRILL.

No. 347,779. Patented Aug. 24, 1886.

Witnesses: Inventor:
J. A. Edwards Thos. Edwards Jr.
A. P. Stewart

N. PETERS, Photo-Lithographer, Washington, D. C.

UNITED STATES PATENT OFFICE.

THOMAS EDWARDS, JR., OF HARING, MICHIGAN.

GARDEN-SEED DRILL.

SPECIFICATION forming part of Letters Patent No. 347,779, dated August 24, 1886.

Application filed August 10, 1885. Serial No. 173,992. (No model.)

*To all whom it may concern:*

Be it known that I, THOMAS EDWARDS, Jr., a citizen of the United States, and a resident of Haring, in the county of Wexford and State of Michigan, have invented a new and useful Improvement in Garden-Seed Drills, of which the following is a specification.

My invention relates to improvements in garden-seed drills, the objects of which are to provide a small light drill that can be easily pushed by hand, to be used in planting all kinds of garden-seeds.

Reference is made to the accompanying drawings, which form part of the specification.

Figure 1:
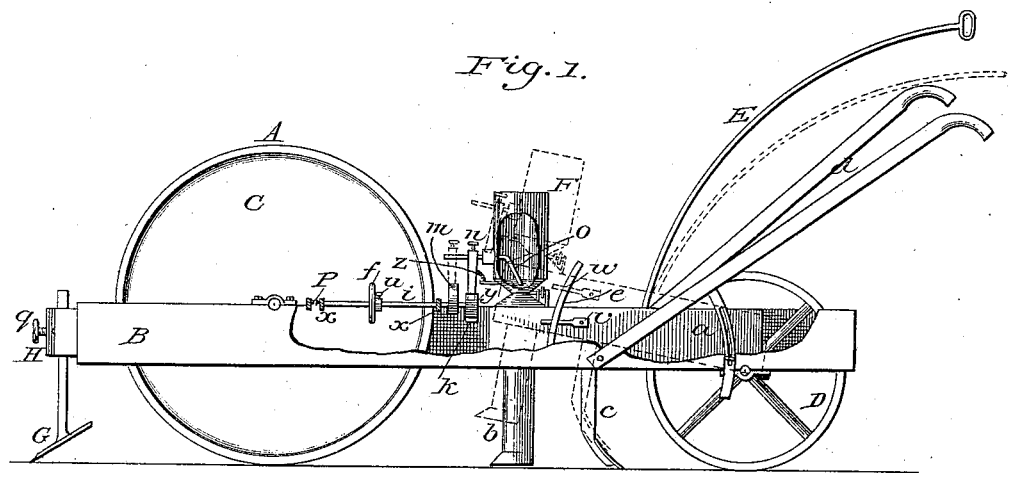
Figure 2:
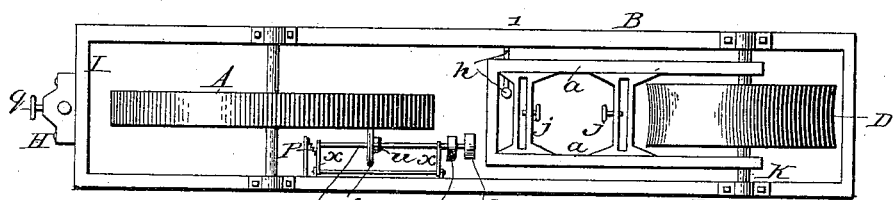
Figures 3, 4:
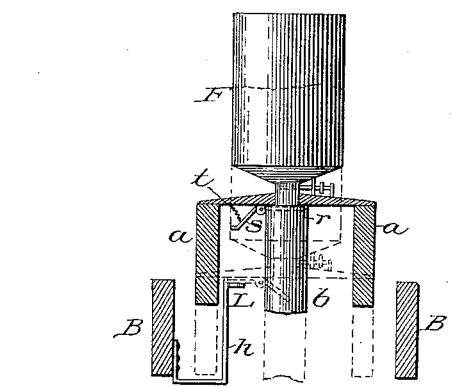

Figure 1 is a side elevation of the machine, with one side of frame B partly broken away to show the inside works. Fig. 2 is a top view of the machine with the hopper removed. Fig. 3 is a vertical section of a part of the machine. Fig. 4 is a front view showing the grader.

Similar letters refer to similar parts throughout the several views.

C is a plow, scraper, or grader, shaped like an inverted T, the lower part being slightly hollowed, so as to scoop the ground somewhat, and fastened at any desired height. It is designed to render the ground smooth before seeding. The upper end is fastened by a thumb-screw, $q$. It can thus be raised or lowered or turned obliquely to the course of the drill at any desired angle, so as to remove stones or any other light obstruction from the course of the drill, or to grade the ground when the drill is moving parallel to the furrow left by the harrow.

A D are the main wheels on which the frame is carried.

B B is the frame, which is partly broken away in Fig. 1 to show the inside works.

$a\,a$, Fig. 2, is a swinging frame on which the hopper F and the opening and covering plows $b\,c$ are fastened, and can be raised and lowered, as hereinafter described.

$d\,d$ are the handles by which the drill is pushed.

$f$ is a friction-wheel on shaft $i$, and is held against the solid plating C in the side of wheel A by spring P, being adjustably fastened on shaft $i$ by thumb-screw $u$. Said friction-wheel can be moved to any desired part of the shaft, the object of which is hereinafter explained.

$n$ is an arm, fastened by a thumb-screw on agitator-arm $o$, and held to bear on wheel $k$ by spring $z$, or can be adjusted to rest on wheel $m$, which is eccentrical in form, and when caused to revolve by the action of wheel $f$ gives arm $n$ and agitator-arm $o$ a constant vibrating movement, stirring a steady stream of seed through the hole in the bottom of the hopper. If arm $n$ is adjusted to rest on wheel $k$, which has one or more blunt protuberances, $y$, (in this case one,) it will receive a sudden jar whenever any of the protuberances pass under it, and remain still till the arrival of the next protuberance, thus causing the seed to be dropped in jets. The seeds drop through hollow plow $b$ into the furrow made by said plow, and are covered by plow $c$.

By moving friction-wheel $f$ toward the axle of wheel A it will travel in a much smaller circle and give a slower motion to shaft $i$, and consequently to wheels $k$ and $m$; so by resting arm $n$ on wheel $k$ the jets of seed will be placed a longer distance apart, while by moving friction-wheel $f$ toward the outside of wheel A the shaft $i$ will receive a quicker motion and place the jets of seed closer together. Thus by moving friction-wheel $f$ to any desired point on shaft $i$ the seed can be placed any desired distance apart, and thus save almost all the labor of thinning the plants. The secondary or swinging frame $a\,a$, being hinged on axle K, can be lifted by bearing on lever E until catch $v$ engages in a curve, $w$, of the spring-arm $e$, and so lift notch-arm $n$ off of wheel $m$ or $k$ and the plows $b\,c$ out of the ground. The frame will remain thus raised, being held up by spring $e$, until it is pushed down by lifting on lever E. Valve $r$, Fig. 3, is held closed by spring $t$ acting on lever $s$, which is attached to the valve, when the frame $a\,a$ is raised, and when the frame is lowered and the plows are in the ground, lever $s$ will rest on plate L on the top of rod $p$, and open the valve $r$, so the seed can pass out, thus preventing all loss of seed when the plows are not in use, and in no wise retarding the flow of seed when the plows are in use.

Having thus fully described my invention, what I claim as new, and wish to secure by Letters Patent, is—

1. In the garden-seed drill, the frame B, grader G, bearing-wheels A and D, (D a disk,) friction-wheel $f$, adjustable on shaft $i$, carrying cam-wheels k and m, in combination with adjustable arm n, mounted on agitator-shaft o, the agitator, hopper F, furrower or plow b, and coverer c, substantially as shown and described.

2. In the garden-drill, the inner frame, a, carrying the seed-operating apparatus, furrower or plow b, and coverer c, journaled to the axle of wheel D, in combination with lever E and locking device v e w, substantially as shown and described.

3. In the garden-seed drill, the frame B, grader G, wheels A and D, friction-wheel f, journaled on shaft i, and wheels k m, in combination with arm n, mounted on the agitator, shaft o, the agitator, hopper F, spring-valve r, furrower or plow b, coverer c, lever E, and locking device, substantially as fully described and set forth.

THOMAS EDWARDS, JR.

Witnesses:
JAMES A. EDWARDS,
A. T. STEWARD.